United States Patent
Yu (10) Patent No.: US 8,616,752 B2
(45) Date of Patent: Dec. 31, 2013

(54) BACKLIGHT UNIT AND DISPLAY DEVICE THEREWITH

(75) Inventor: Dong Kug Yu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 194 days.

(21) Appl. No.: 13/174,037

(22) Filed: Jun. 30, 2011

(65) Prior Publication Data

US 2012/0008337 A1 Jan. 12, 2012

(30) Foreign Application Priority Data

Jul. 9, 2010 (KR) ........................ 10-2010-0066206

(51) Int. Cl.
*F21V 29/00* (2006.01)
*F21V 19/00* (2006.01)

(52) U.S. Cl.
USPC .......................................... 362/612; 362/634

(58) Field of Classification Search
USPC ................... 362/612, 613, 633, 634
See application file for complete search history.

(56) References Cited

U.S. PATENT DOCUMENTS

| | | | | |
|---|---|---|---|---|
| 7,578,610 B2 * | 8/2009 | Sakamoto et al. | ............ | 362/634 |
| 7,591,578 B2 * | 9/2009 | Chang | ............ | 362/612 |
| 7,604,389 B2 * | 10/2009 | Sakai et al. | ............ | 362/612 |
| 7,903,198 B2 * | 3/2011 | Abe et al. | ............ | 349/65 |
| 8,021,032 B2 * | 9/2011 | Pei | ............ | 362/612 |
| 8,197,113 B2 * | 6/2012 | Park et al. | ............ | 362/631 |
| 2007/0133222 A1 * | 6/2007 | Watanabe et al. | ............ | 362/561 |
| 2008/0049444 A1 * | 2/2008 | Hsiao et al. | ............ | 362/611 |
| 2010/0073959 A1 * | 3/2010 | Hamada | ............ | 362/611 |

FOREIGN PATENT DOCUMENTS

| | | |
|---|---|---|
| CN | 101131500 A | 2/2008 |
| JP | 2003-279973 A | 10/2003 |
| JP | 2006-208723 A | 8/2006 |
| JP | 2007-163620 A | 6/2007 |
| JP | 101338867 A | 1/2009 |
| KR | 10-2000-0014947 A | 3/2000 |
| KR | 10-0879772 B1 | 1/2009 |
| KR | 10-2009-0122054 A | 11/2009 |

* cited by examiner

*Primary Examiner* — Peggy A. Neils
(74) *Attorney, Agent, or Firm* — Birch, Stewart, Kolasch & Birch, LLP (57) ABSTRACT

A backlight unit includes a bottom cover, a first heat sink portion disposed on the bottom cover, a second heat sink portion extended upward with respect to the first heat sink portion, and at least a portion of a light emission module placed in at least one recess or at least one hole of the first heat sink portion, and the light emission module disposed on the second heat sink portion.

17 Claims, 11 Drawing Sheets

BACKLIGHT UNIT AND DISPLAY DEVICE THEREWITH

CROSS REFERENCE TO RELATED APPLICATION

This application claims the benefit of the Patent Provisional Application No. 10-2010-0066206, filed on Jul. 9, 2010, which is hereby incorporated by reference as if fully set forth herein.

BACKGROUND OF THE DISCLOSURE

1. Field

The present invention relates to a backlight unit and a display device therewith.

2. Discussion of the Related Art

In general, a liquid crystal display device is used widely as a monitor of a cellular phone or a computer and a display device of a television set along with a plasma display panel, or an electro-luminescence display device owing to an excellent visibility compared to a cathode ray tube CRT, low average power consumption and low heat generation compared to the same screen sized CRT.

The liquid crystal display device is driven by utilizing optical anisotropy and polarization of liquid crystals. Since the liquid crystals are thin and lengthy, molecules of the liquid crystals can be oriented, enabling to control molecular orientation of the liquid crystals by applying an electric field to the liquid crystals, artificially.

Therefore, if the orientation of the liquid crystal molecules is controlled as desired, the orientation of the liquid crystal molecules changes, causing a light to refract in a direction of the orientation of the liquid crystal molecules by the optical anisotropy to display picture information.

However, since the liquid crystal display device is a light receiving device that can not emit the light spontaneously, to require a separate light source, the liquid crystal display device uses the backlight unit as a light source.

That is, the liquid crystal display device can display a picture by directing the light from the backlight unit to an overlying liquid crystal panel and controlling a quantity of the light transmitting through the liquid crystals by varying the orientation of the liquid crystals.

SUMMARY

The embodiment provides a backlight unit and a display device therewith, which can prevent a substrate thereof from bending by heat.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit in accordance with the embodiment can include a bottom cover, a first heat sink portion disposed on the bottom cover, a second heat sink portion extended upward with respect to the first heat sink portion, and at least a portion of a light emission module placed in at least one recess or at least one hole of the first heat sink portion, and the light emission module disposed on the second heat sink portion.

The recess or hole in the first heat sink portion can be formed in an edge of the first heat sink portion adjacent to the second heat sink portion.

In this instance, the recess in the first heat sink portion can be a line shaped single recess, or a plurality of recesses disposed at regular intervals.

Next, the hole in the first heat sink portion can be a line shaped single hole, or a plurality of holes disposed at regular intervals.

Then, the backlight unit can further includes a knoll formed at an edge region of the first heat sink portion adjacent to the second heat sink portion spaced from the second heat sink portion.

In this instance, the knoll has singular which can be a line shaped one body formed along and parallel to a boundary surface between the first heat sink portion and the second heat sink portion, or plural formed along and parallel to the boundary surface between the first heat sink portion and the second heat sink portion.

And, the second heat sink portion can be connected to the edge region of the first heat sink portion having the recess or hole formed therein and bent perpendicular to a surface of the first heat sink portion.

Then, the light emission module can have at least one coupling projection formed at one side thereof matched to the recess or hole in the first heat sink portion.

A backlight unit in accordance with the embodiment includes a bottom cover, a light guide plate disposed on the bottom cover, a first heat sink portion on an inside of the bottom cover to be perpendicular to a light incident surface of the light guide plate and having at least one recess formed therein, a second heat sink portion perpendicular to and being one body with the first heat sink portion, a light emission module including at least a portion of a circuit board placed in the at least one recess in the first heat sink portion, and a light source unit disposed on the circuit board, and an optical sheet disposed on the light guide plate.

A display device having a backlight unit in accordance with the embodiment includes a bottom cover, a light guide plate disposed on the bottom cover, a first heat sink portion on an inside of the bottom cover to be perpendicular to a light incident surface of the light guide plate and having at least one recess formed therein, a second heat sink portion perpendicular to and being one body with the first heat sink portion, a light emission module including at least a portion of a circuit board placed in the at least one recess in the first heat sink portion, and a light source unit disposed on the circuit board, an optical sheet disposed on the light guide plate, and a display panel disposed on the optical sheet.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference will now be made in detail to the specific embodiments of the present invention, examples of which are illustrated in the accompanying drawings.

Figure 1:
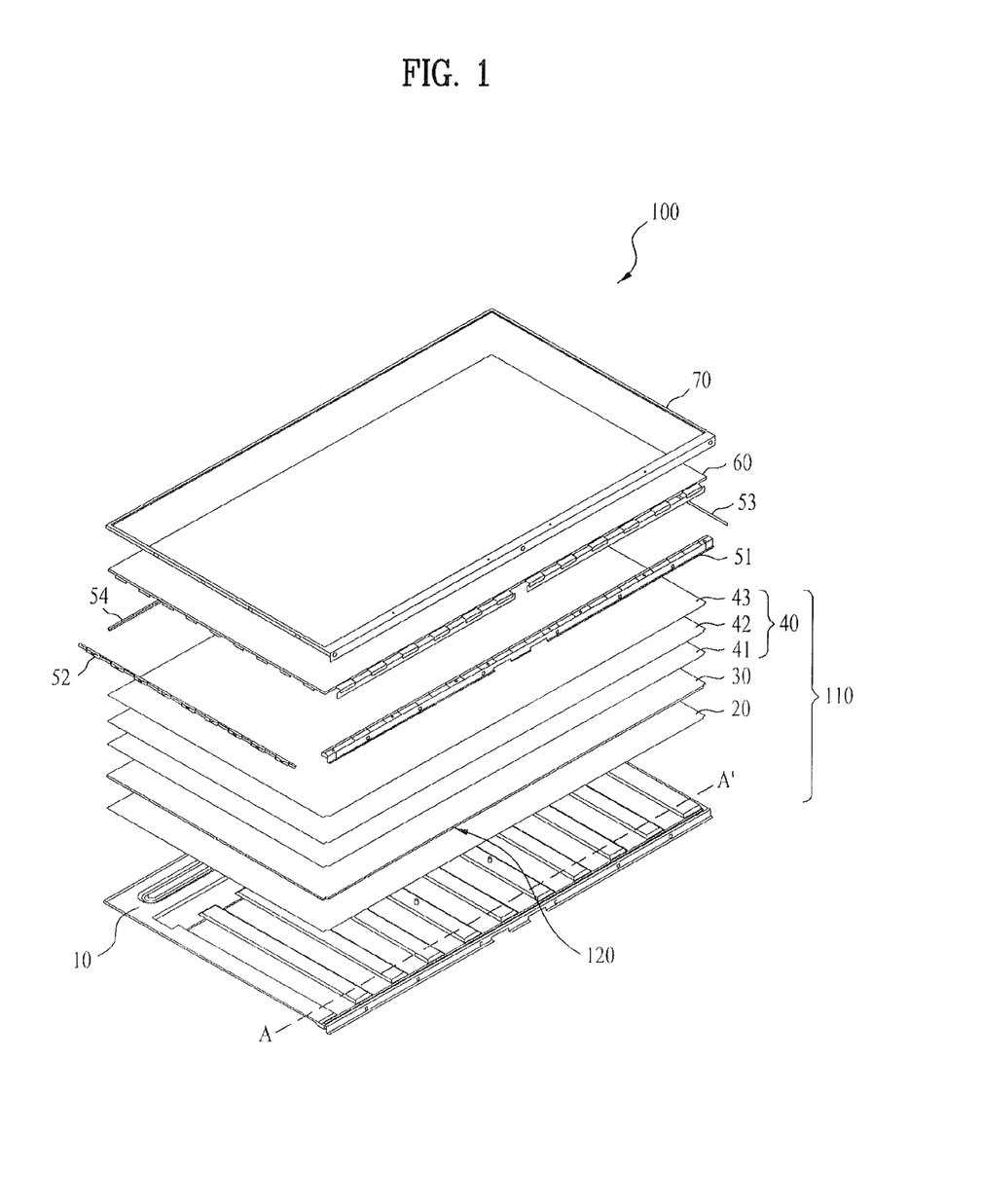
FIG. 1 illustrates an exploded perspective view of a display device in accordance with the embodiment.

FIG. 1 illustrates an exploded perspective view of a display device 100 in accordance with the embodiment. Referring to FIG. 1, the display device 100 includes a backlight unit 110, fastening members 51 to 54, a liquid crystal panel 60, and a upper cover 70.

The backlight unit 110 supplies a light to the liquid crystal panel 60. The backlight unit 110 includes a bottom cover 10, a light emission module (not shown), a reflective sheet 20, a light guide plate 30, and an optical sheet 40.

Though not shown in FIG. 1, the light emission module is provided to one side of the bottom cover 10. The reflective sheet 20 is disposed to a front of the bottom cover 10 in rear of the light guide plate 30 for reflecting the light from the light emission module toward the light guide plate 30 for improving optical efficiency. The reflective sheet 20 can be provided as a separate element as shown in FIG. 1, or as a coating of a highly reflective material on a rear surface of the light guide plate 30 or a front surface of the bottom cover 10.

The light guide plate 30 is disposed in front of the reflective sheet 20 for guiding the light from the light emission module to the liquid crystal panel 60.

The optical sheet 40 is disposed on a front of the light guide plate 30 for making the light from the light guide plate 30 to diffuse and refract to improve brightness and optical efficiency. The optical sheet 40 can have one or a plurality of elements.

For an example, the optical sheet 40 can have a first diffusion sheet 41, a prism sheet 42 and a second diffusion sheet 43, or one optical sheet having a function of the diffusion sheet and a function of the prism sheet. A number and kinds of the optical sheet 40 can be varied with a brightness characteristic.

In this instance, the diffusion sheets 41 and 43 change the light from the light guide plate 30 to a surface light source of a more uniform brightness, and the prism sheet 42 changes a side light to a frontal light and converges a radiating light to make brightness of the light higher.

The liquid crystal panel 60 is disposed in front of the optical sheet 40, and the upper cover 70 is provided in front of the liquid crystal panel 60. The liquid crystal panel 60 has liquid crystals positioned between glass substrates, and polarization plates placed on the glass substrates for using polarity of the light. In this instance, the liquid crystals have an intermediate characteristic of liquid and solid, in which the liquid crystals that are organic molecules having fluidity like liquid disposed regularly like a crystal. A picture is displayed by using a characteristic of the liquid crystals in which an orientation of liquid crystal molecules varies with external electric fields.

The fastening members 51 to 54 are disposed between the bottom cover 10 and the upper cover 70 for fastening the bottom cover 10 and the upper cover 70, together.

Figure 2:
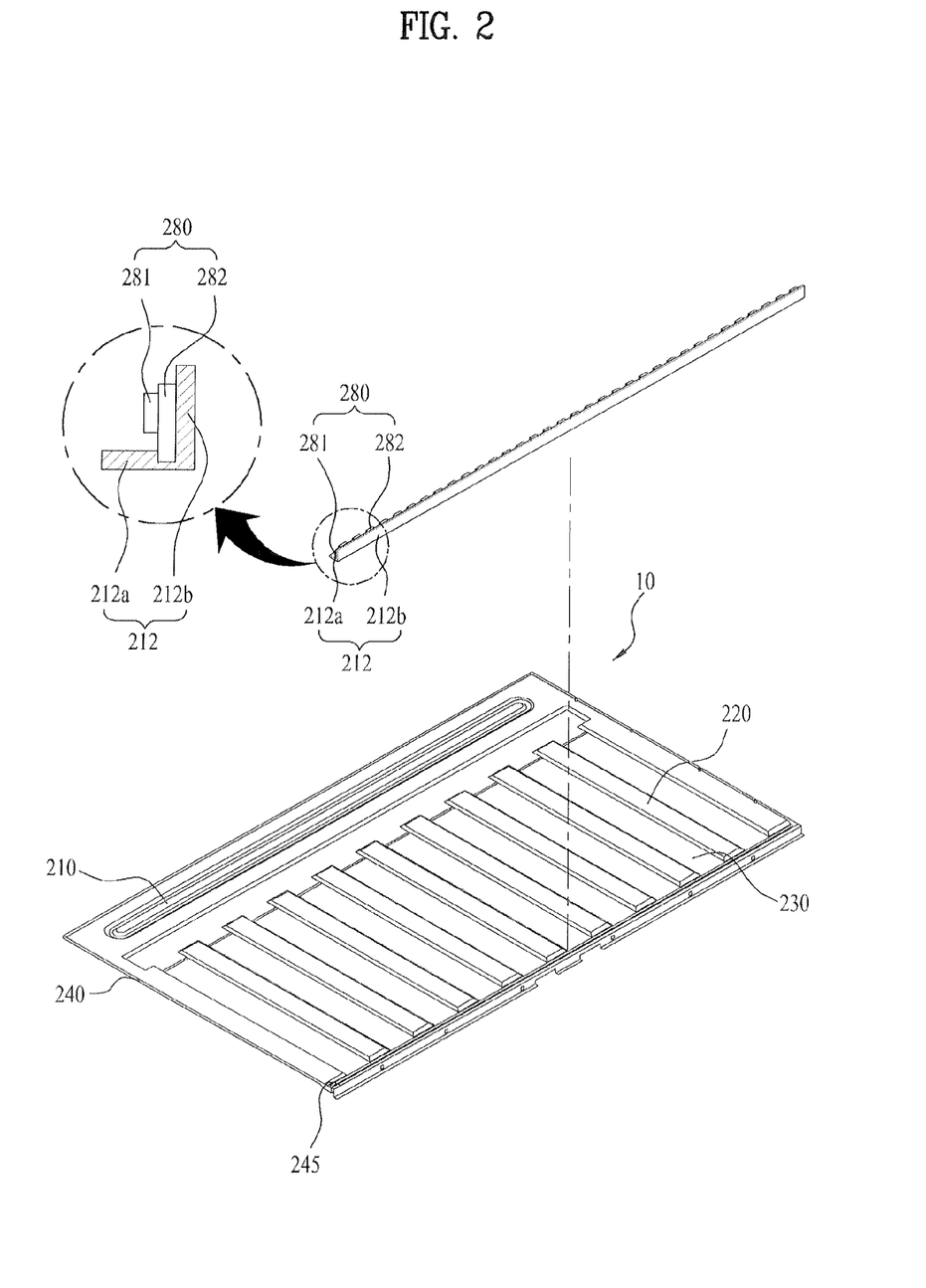
FIG. 2 illustrates a perspective view of a light emission module and a second heat sink disposed on the bottom cover in FIG. 1 in accordance with a preferred embodiment of the present invention.

FIG. 2 illustrates a perspective view of a light emission module 280 and a second heat sink 212 disposed on the bottom cover 10 in FIG. 1 in accordance with a preferred embodiment of the present invention.

Referring to FIG. 2, the bottom cover 10 can include a first forming portion 210 constructed of a metal plate having a lateral extension projected forward for reinforcing strength thereof, and second forming portions 220 formed perpendicular to the first forming portion projected forward, respectively. The first forming portion 210 and the second forming portion 220 can be formed by pressing the bottom cover 10 with a press.

Between adjacent second forming portions 220, a first heat sink 230 in a shape of a heat sink can be mounted. A plurality of the first heat sinks 230 can be provided spaced from one another.

The bottom cover 10 can have a rim wall 240 bent forward from edges thereof for preventing the reflective sheet 20, the light guide plate 30, or the optical sheet 40 from falling off to an outside of the bottom cover 10. In order to reinforce the bottom cover 10, an H beam can be mounted to a rear surface of the bottom cover 10.

FIG. 2 illustrates the light emission module 280 which FIG. 1 does not show. The light emission module 280 is mounted to a lower portion of the bottom cover 10. Mounted between the light emission module 280 and the bottom cover 10, there is a second heat sink 212.

The light emission module 280 is in contact with one side of the second heat sink 212, and coupled and secured thereto. The second heat sink 212 can be mounted to the bottom cover 10 in contact with the first heat sink 230.

In detail, the second heat sink 212 can be mounted on an inside of the bottom cover 10 to be in contact with the rim wall 245 at one side of the bottom cover 10 and the first heat sink 230.

For an example, the second heat sink 212 can have an "L" shaped bracket. In this instance, the second heat sink 212 can be formed to include a first heat sink portion 212a and a second heat sink portion 212b formed as one unit.

The first heat sink portion 212a is in surface to surface contact with the first heat sink 230, and in contact with an inside of the bottom cover 10 perpendicular to a light incident surface of the light guide plate 30. The second heat sink portion 212*b* is perpendicular to the first heat sink portion 212*a* and can be in surface to surface contact with the light emission module 280.

In detail, the first heat sink portion 212*a* is in contact with the bottom cover 10 perpendicular to the light incident surface 120 of the light guide plate 30. The second heat sink portion 212*b* can be perpendicular to the first heat sink portion 212*a* and horizontal to the light incident surface 120. The second heat sink portion 212*b* can be secured to the rim wall 245 at one side of the bottom cover 10, and a rear side of the second heat sink portion 212*b* can be in contact with the rim wall 245 at one side of the bottom cover 10.

The light emission module 280 includes a circuit board 282 and a light source unit 281 disposed on the circuit board 282. At least a portion of the light emission module 280 can be coupled and fastened to the second heat sink 212. The light source unit 281 can be an LED (Light emitting device) or an LED package, but the light source unit 281 is not limited to this.

Figure 3:
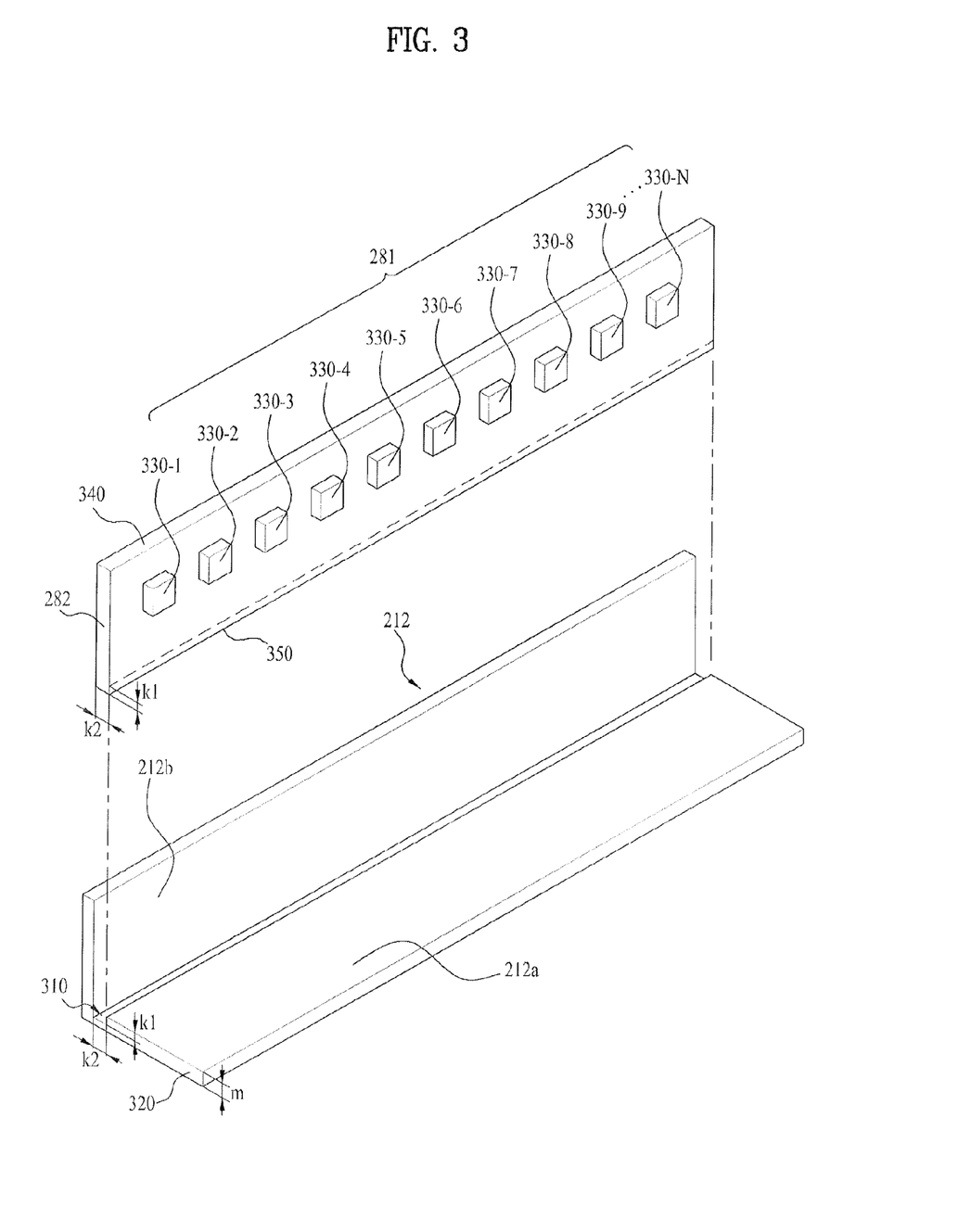
FIG. 3 illustrates an exploded perspective view of the light emission module and the second heat sink in FIG. 2.

FIG. 3 illustrates an exploded perspective view of the light emission module 280 and the second heat sink 212 in FIG. 2.

Referring to FIG. 3, the second heat sink 212 has a line of single coupling recess 310 formed in one region of the first heat sink portion 212*a* adjacent to the second heat sink portion 212*b*. The coupling recess 310 is in contact with the second heat sink portion 212*b*. That is, the line shaped coupling recess 310 is formed in the first heat sink portion 212*a* adjacent to a boundary surface at which the first heat sink portion 212*a* and the second heat sink portion 212*b* are in contact to each other. The coupling recess 310 can also be formed to open a side 320 of the first heat sink portion 212*a*. The line shaped coupling recess 310 can be horizontal to the first heat sink portion 212*a*.

The light emission module 280 has the circuit board 282 and a plurality of LED packages 281:310-1 to 310-N (where N is a natural numeral greater than unity) disposed on one side of the circuit board 282 on a line. The circuit board 282 can be a rectangular bar. A side of the circuit board 282 having a relatively long length will be called as a "long side" and a side of the circuit board 282 having a relatively short length will be called as a "short side". And, a surface having the LED packages 281 mounted thereto will be called as a "front surface" of the circuit board 282, a surface opposite thereto will be called as a "rear surface".

The plurality of LED packages 281 are mounted horizontal to a first long side 340 of the circuit board 282. In this instance, the plurality of LED packages 281 can be mounted adjacent to the first long side 340 closer than a second long side 350.

Both the second long side 350 of the circuit board 282 and the coupling recess 310 can have line shapes, respectively. The second long side 350 of the circuit board 282 is placed in the coupling recess 310 such that a rear surface of the circuit board 282 is in contact with the second heat sink portion 212*b*. As the second long side 350 is placed in the coupling recess 310 in the second heat sink 212, the circuit board 282 is secured to the second heat sink 212.

A depth K1 of the coupling recess 310 can vary with a size of the circuit board 282. For an example, in order to make the second long side 350 of the circuit board 282 to couple to the coupling recess 310 for fastening the circuit board 282 to the second heat sink 212 securely, the depth K1 of the coupling recess 310 can be greater than ½ of a thickness m of the second heat sink portion 212*b*.

And, in order to make the second long side 350 of the circuit board 282 to couple and fasten to the coupling recess 310 securely, a width K2 of the coupling recess 310 can be determined taking a width of the second long side 350 of the circuit board 282 into account. For an example, the width K2 of the coupling recess 310 can be the same with the width of the second long side 350.

In the related art backlight unit, the circuit board is attached to the bottom cover or the heat sink with a two sided tape. Since the LED packages are heat sources which emit large amounts of heat, the circuit board having the LED packages mounted thereto is liable to bend by the heat from the LED packages, and since an extent of the bending is substantial, the optical characteristic of the backlight unit can become poor.

Even if a tensile force caused by the heat from the LED packages 330-1 to 330-N acts on the circuit board 282, the embodiment can reduce bending deformation of the circuit board 282 owing to a structure in which the circuit board 282 is placed in the coupling recess 310 in the second heat sink 212.

Figure 4:
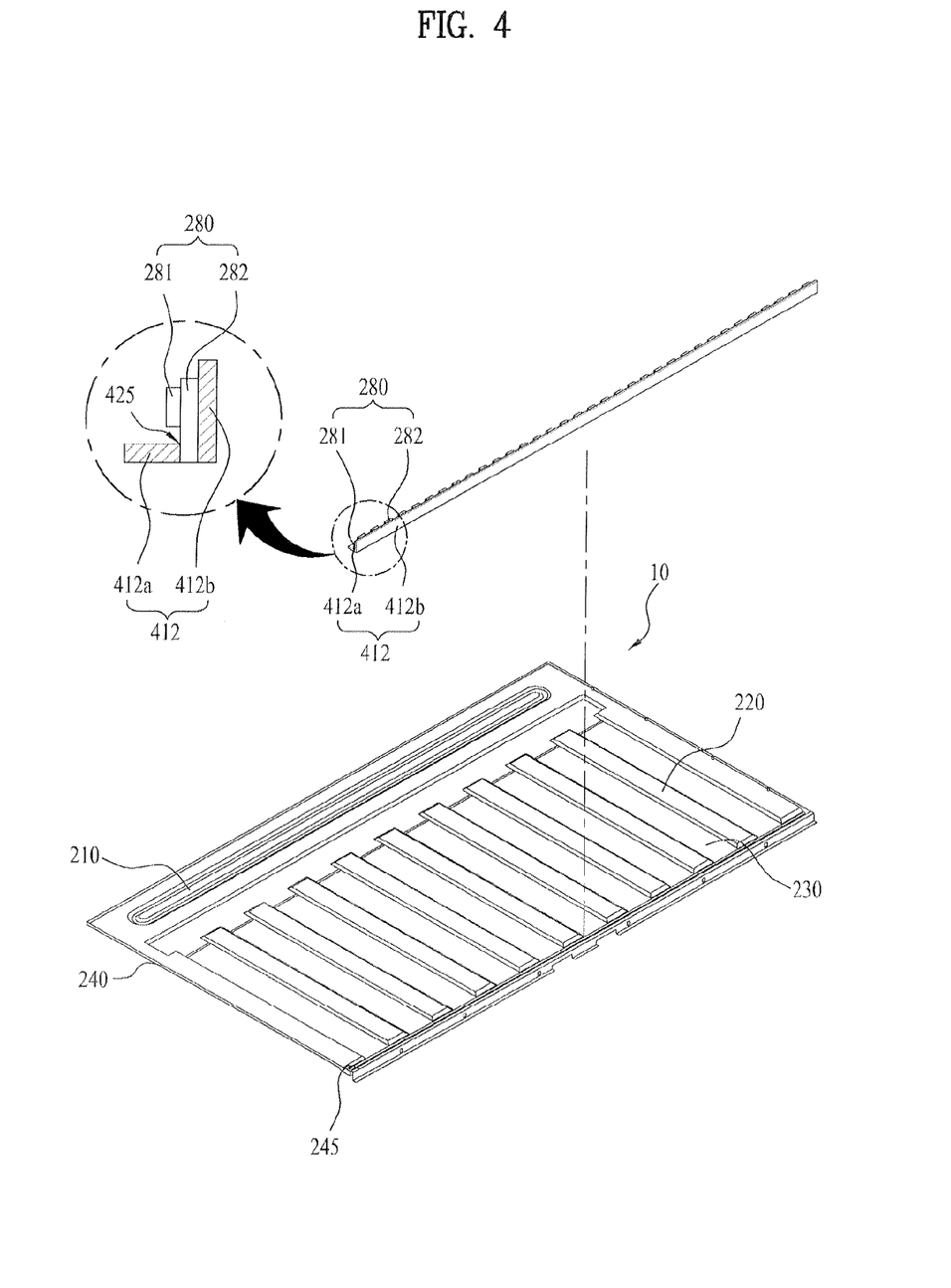
FIG. 4 illustrates a perspective view of a light emission module and a second heat sink disposed on the bottom cover in FIG. 1 in accordance with another preferred embodiment of the present invention.

FIG. 4 illustrates a perspective view of a light emission module and a second heat sink disposed on the bottom cover in FIG. 1 in accordance with another preferred embodiment of the present invention. The second heat sink 412 in FIG. 4 can be compared to the second heat sink 212 to find that the second heat sink 412 is the same with the second heat sink 212 except that a coupling recess 425 passes through the first heat sink portion 412*a*. As a second long side 350 of the circuit board 282 is placed in the coupling recess 425, a light emission module 280 can be secured to the second heat sink 412.

Figure 5:
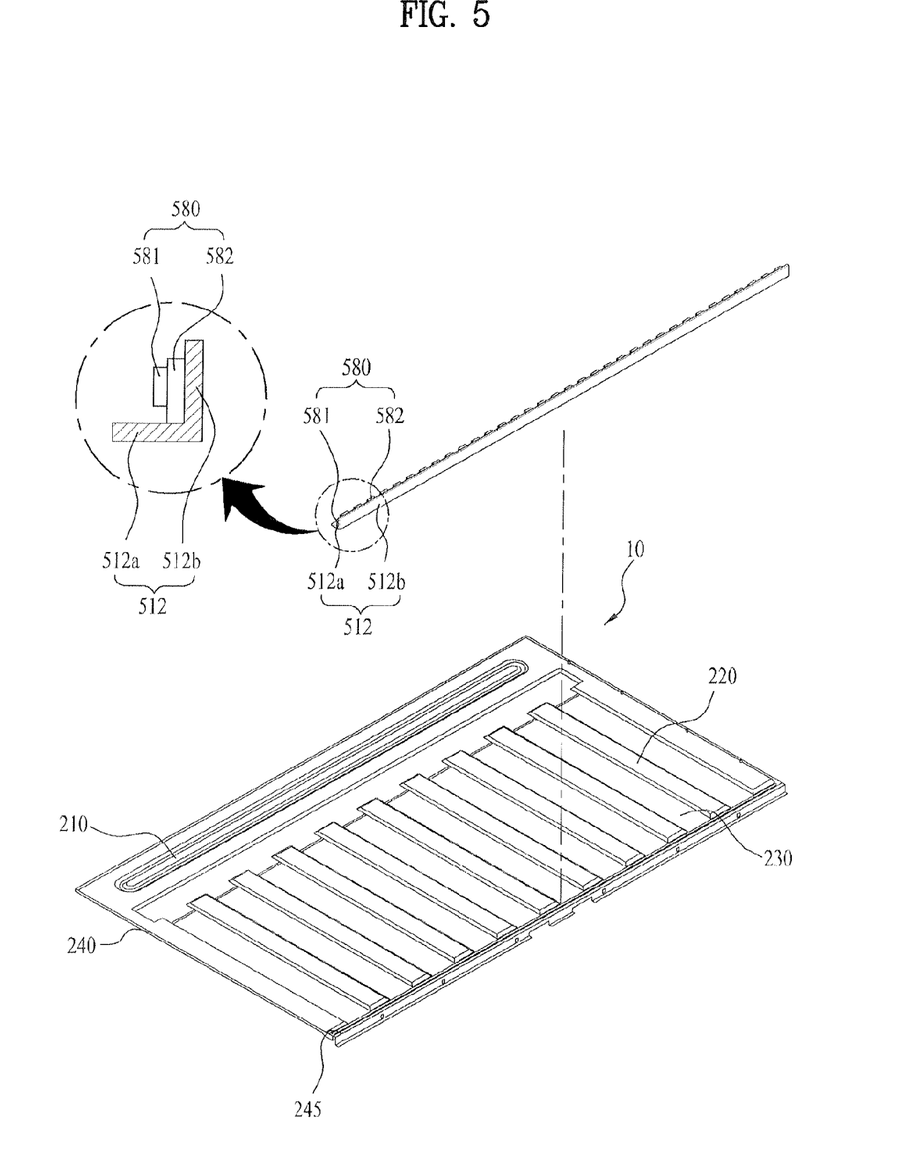
FIG. 5 illustrates a perspective view of a light emission module and a second heat sink disposed on the bottom cover in FIG. 1 in accordance with another preferred embodiment of the present invention.
Figure 6:
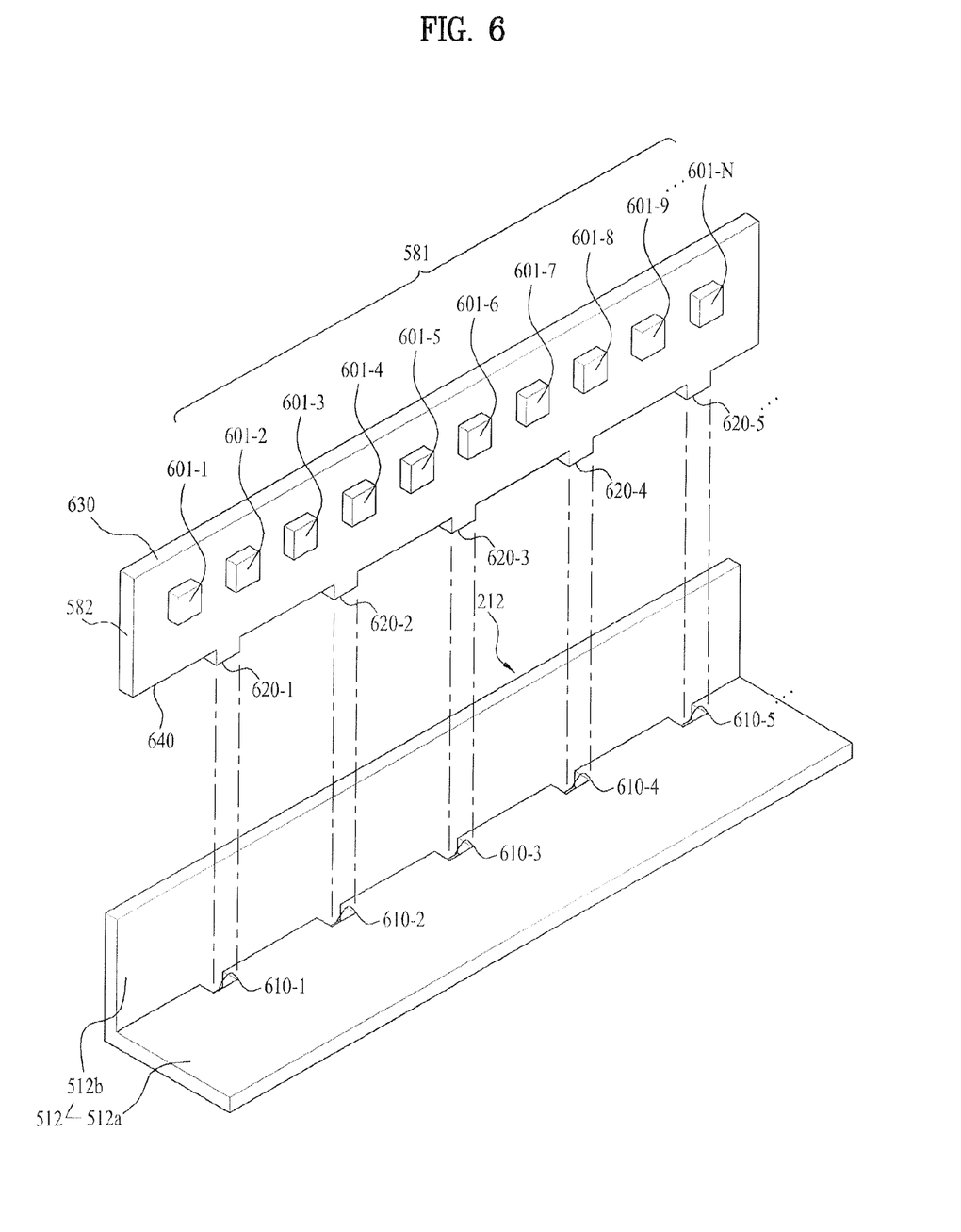
FIG. 6 illustrates an exploded perspective view of the light emission module and the second heat sink in FIG. 5.

FIG. 5 illustrates a perspective view of a light emission module 580 and a second heat sink 512 disposed on the bottom cover 10 in FIG. 1 in accordance with another preferred embodiment of the present invention, and FIG. 6 illustrates an exploded perspective view of the light emission module 580 and the second heat sink 512 in FIG. 5.

Referring to FIG. 5, the light emission module 580 is in contact with one side of the second heat sink 512 and coupled and fastened thereto. The second heat sink 512 can be mounted to the bottom cover 10 in contact with the first heat sink 230.

The second heat sink 512 can be "L" shaped, and can include a unitized first heat sink portion 512*b* and second heat sink portion 512*b*.

The first heat sink portion 512*a* is in surface to surface contact with the first heat sink 230, and the second heat sink portion 512*b* can be in surface to surface contact with the light emission module 580. The first heat sink portion 512*a* and the second heat sink portion 512*b* can be disposed in a bent form.

In detail, the first heat sink portion 512*a* is in contact with the bottom cover 10 perpendicular to the light incident surface 120 of the light guide plate 30, and a rear surface of the second heat sink portion 512*b* can be in contact with one side of the rim wall 245 of the bottom cover 10.

Formed in one region of the first heat sink portion 512*a* adjacent to the second heat sink portion 512*b*, there are a plurality of coupling recesses 610-1~610-M (for an example, M=5) spaced from one another. In this instance, the coupling recesses 610-1~610-5 are in contact with the second heat sink portion 512*b*, and may or may not pass through the first heat sink portion 512*a*.

That is, the coupling recesses 610-1~610-M are formed in the first heat sink portion 512*a* in contact with a boundary surface of the first heat sink portion 512*a* and the second heat sink portion 512*b*.

The light emission module 580 has a rectangular circuit board 582 and a plurality of LED packages 581:601-1 to 601-N (where N is a natural numeral greater than unity) disposed horizontal to a first long side 630 of the circuit board 282 on a line.

The circuit board 582 has coupling projections 620-1~620-M (for an example, M=5) formed in the long side 640 to match with the coupling recesses 610-1~610-5 in the first heat sink portion 512a. In this instance, a number and shapes of the coupling recesses and the coupling projections matched thereto can vary.

The coupling projections 620-1~620-5 are placed in the coupling recesses matched thereto respectively such that a rear surface 650 of the circuit board 582 is in contact with the second heat sink portion 512b, and the second long side 640 of the circuit board 582 is in contact with an upper surface of the first heat sink portion 512a. As the coupling projections 620-1~620-5 are placed in the coupling recesses 610-1~610-5 in the second heat sink 512, the circuit board 582 is fastened to the second heat sink 512.

In order to make the circuit board 582 to be coupled and fastened to the second heat sink 512 securely, depths of the coupling recesses 610-1~610-M, lengths of the coupling projections 620-1~620-M, and numbers thereof can be determined. For an example, the depths K1 of the coupling recesses 610-1~610-M, the lengths of the coupling projections 620-1~620-M can be greater than ½ of a thickness m of the first heat sink portion 512a, respectively.

Figure 7:
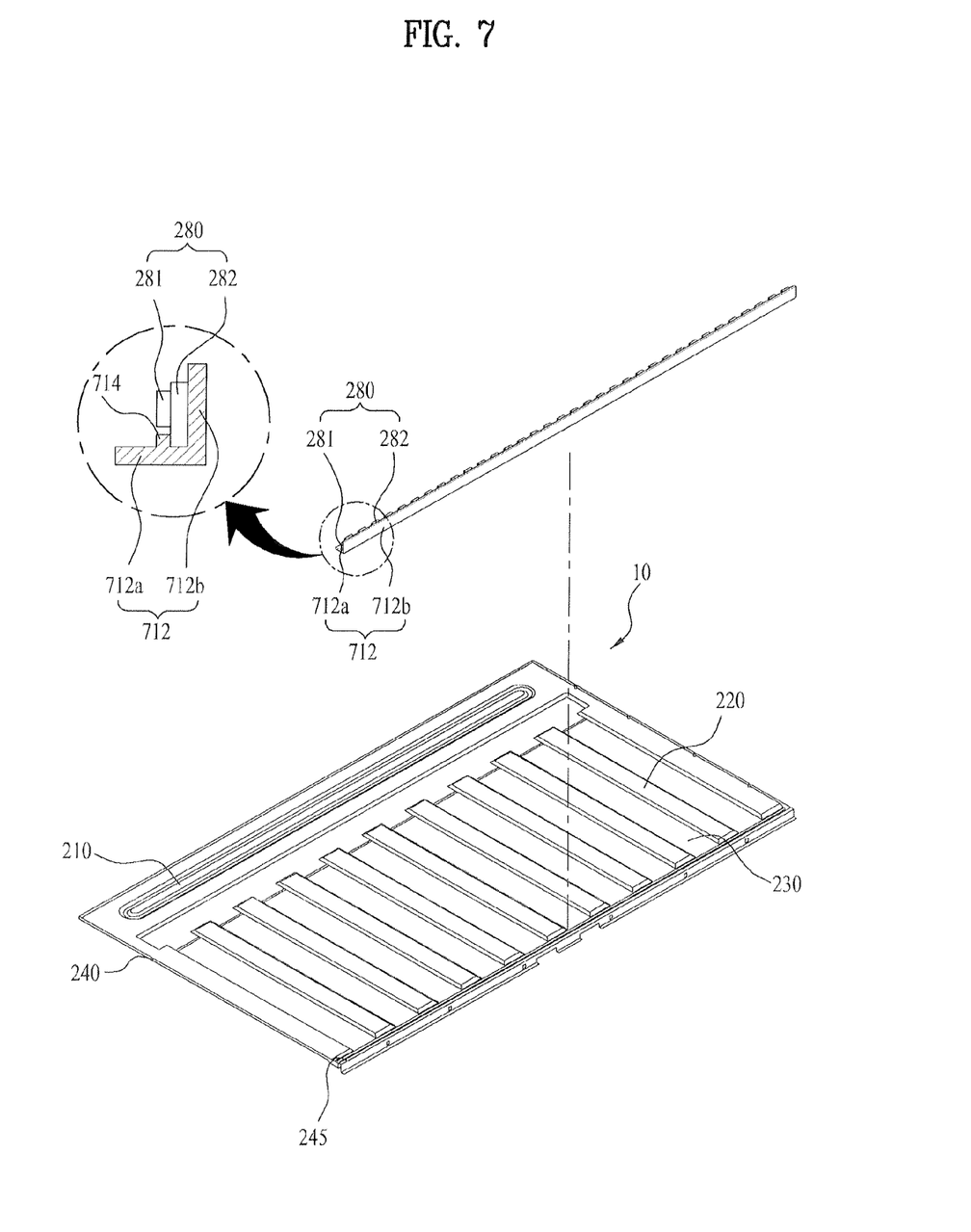
FIG. 7 illustrates a perspective view of a light emission module and a second heat sink disposed on the bottom cover in FIG. 1 in accordance with another preferred embodiment of the present invention.
Figure 8:
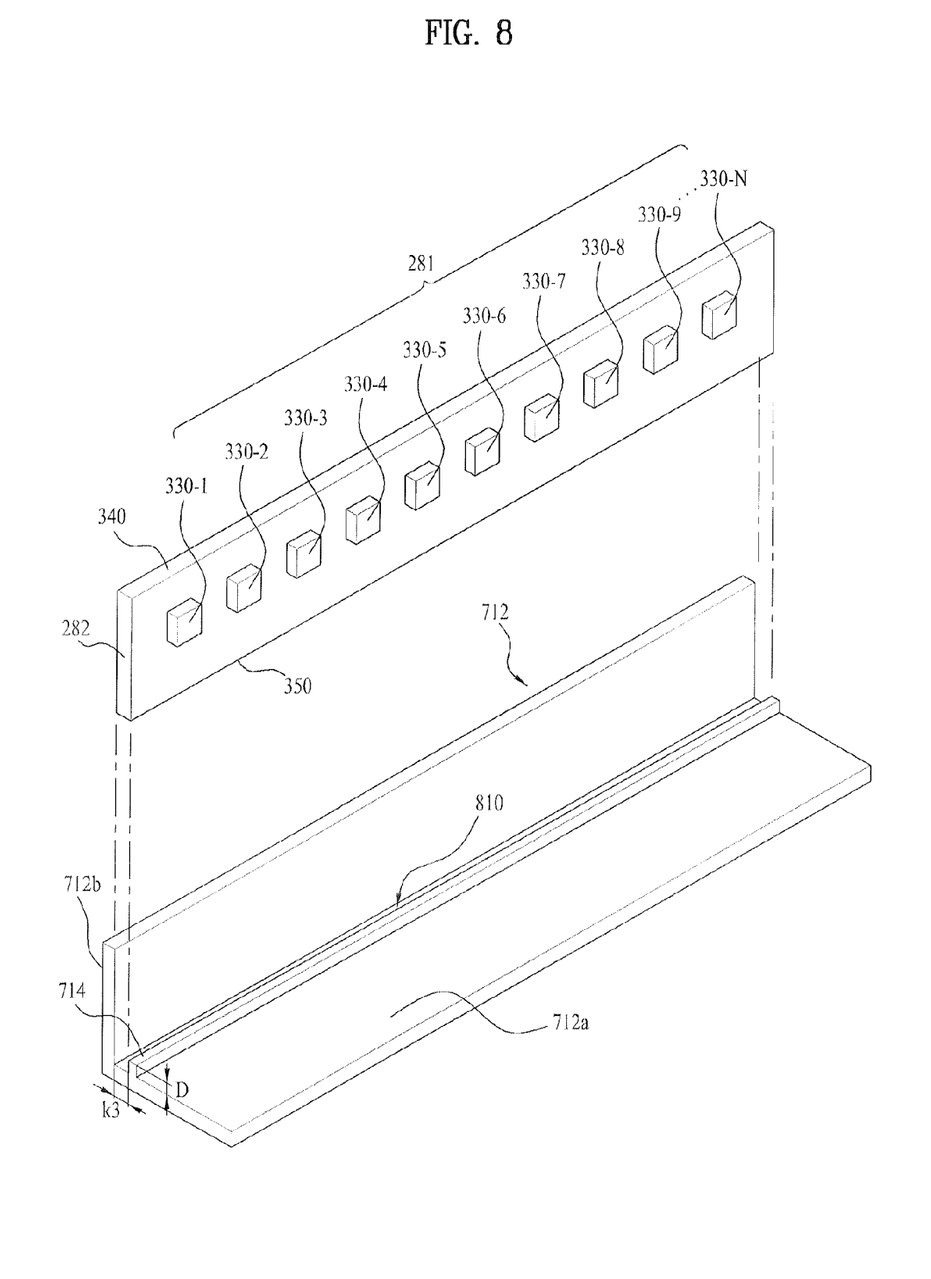
FIG. 8 illustrates an exploded perspective view of the light emission module and the second heat sink in FIG. 7.

FIG. 7 illustrates a perspective view of a light emission module and a second heat sink disposed on the bottom cover 10 in FIG. 1 in accordance with another preferred embodiment of the present invention, and FIG. 8 illustrates an exploded perspective view of the light emission module 280 and the second heat sink 712 in FIG. 7. The light emission module 280 in FIG. 7 is identical to the light emission module described with reference to FIG. 3.

Referring to FIGS. 7 and 8, the light emission module 280 is in contact with one side of a second heat sink 712 and coupled and fastened thereto. The second heat sink 712 can be mounted to the bottom cover 10 in contact with the first heat sink 230.

The second heat sink 712 can be an "L" shaped bracket, including unitized first heat sink portion 712b and second heat sink portion 712b.

The first heat sink portion 712a is in surface to surface contact with the first heat sink 230, and the second heat sink portion 712b can be in surface to surface contact with the light emission module 280.

In detail, the first heat sink portion 712a is in contact with the bottom cover 10 perpendicular to the light incident surface 120 of the light guide plate 30, and a rear surface of the second heat sink portion 712b can be in contact with one side rim wall 245 of the bottom cover 10.

Figure 11:
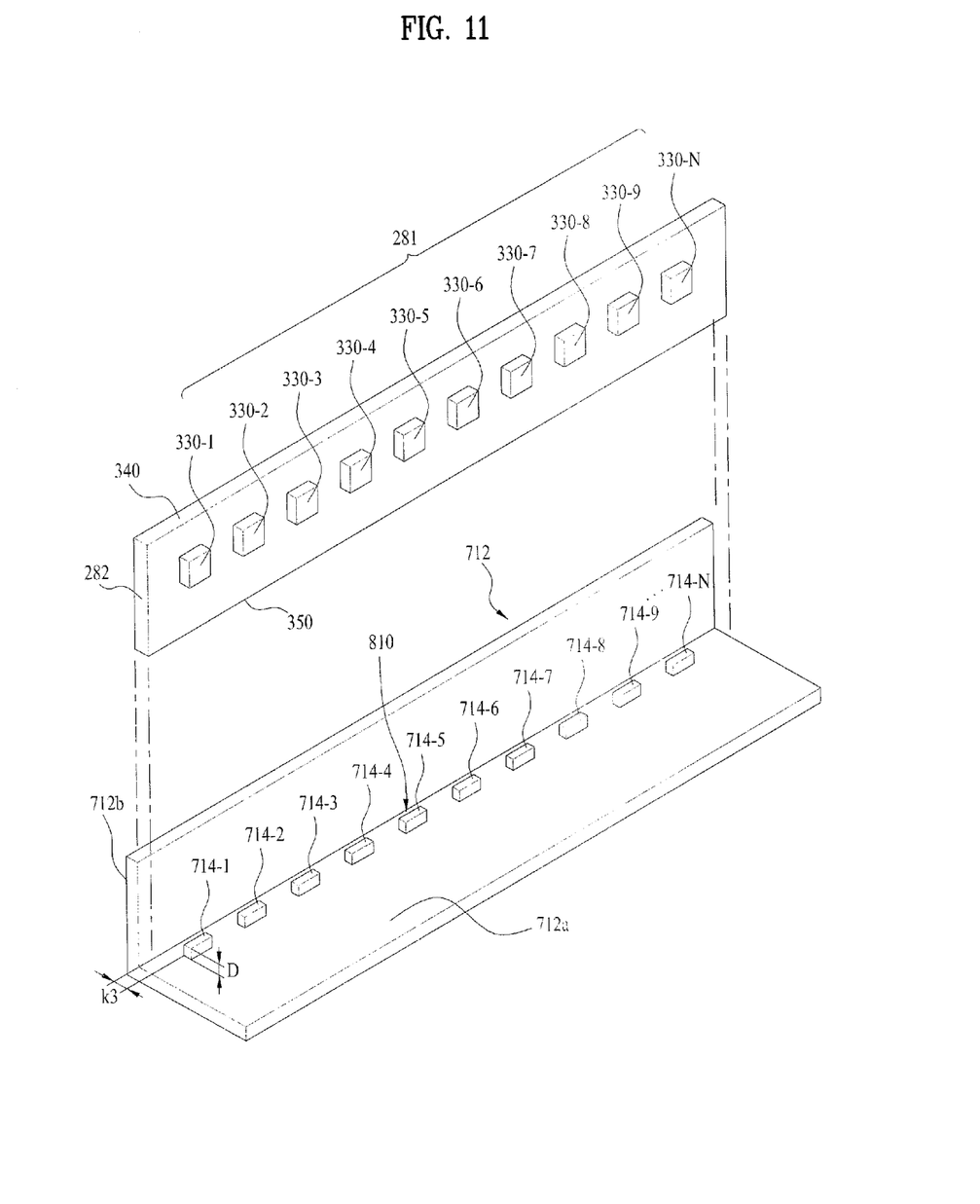
FIG. 11 illustrates an exploded perspective view of the light emission module and the second heat sink in FIG. 7 having a plurality of knolls.

Formed on one region of the first heat sink portion 712a spaced from a distance K3 from the second heat sink portion 712b, there is a line shaped knoll 714. The line shaped knoll 714 is horizontal to the second heat sink portion 712b. Though the knoll 714 in FIG. 8 has one bar shape, the shape of the knoll 714 is not limited to this, but the knoll 714 can be a plurality of divided shapes spaced from each other. FIG. 11 depicts a plurality of knolls 714-1 to 714-n.

The second long side 350 is placed in a space 810 between the second heat sink portion 712b and the knoll 714 such that the rear surface of the circuit board 282 is in contact with the second heat sink portion 712b and the second long side 350 of the circuit board 282 is in contact with the first heat sink portion 712a. As the second long side 350 is placed in the space 810 between the second heat sink portion 712b and the knoll 714, the circuit board 282 can be fastened to the second heat sink 712.

A distance K3 of the knoll 714 from the second heat sink portion 712b is determined taking a width K2 of the second long side 350 into account. That is, the distance K3 can be the same with the width K2 of the second long side 350. And, a height D of the knoll can be determined taking secure coupling and fastening of the circuit board 282 to the second heat sink 712 into account.

Figure 9:
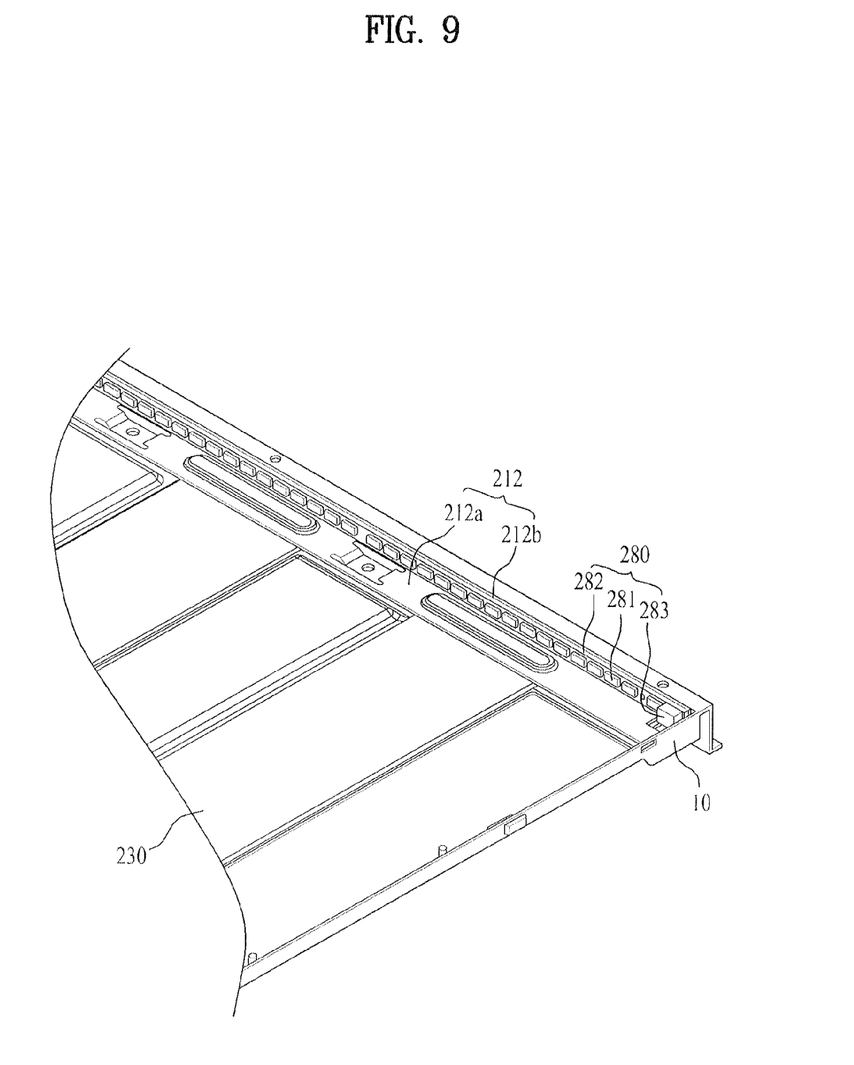
FIG. 9 illustrates a perspective view of a light emission module mounted to an inside of a bottom cover of a backlight unit in accordance with a preferred embodiment of the present invention.

FIG. 9 illustrates a perspective view of a light emission module 280 mounted to an inside of a bottom cover 10 of a backlight unit in accordance with a preferred embodiment of the present invention. As shown in FIG. 9, there are the first heat sinks 230 disposed on a front side of the bottom cover 10 spaced from one another, and there is a second heat sink 212 disposed on a lower side of the first heat sink 230.

The first heat sinks 230 is disposed in a first direction, for an example, in up/down directions, of the bottom cover 10, and the second heat sink 212 is disposed in a second direction, for an example, in a horizontal direction, of the bottom cover 10.

The second heat sink 212 includes a first heat sink portion 212a in contact with the first heat sinks 230, and a second heat sink portion 212b perpendicular to the first heat sink portion 212a, having the light emission module 280 mounted thereon.

The light emission module 280 is mounted to one side of the second heat sink portion 212b and includes a circuit board 282 extended along the second heat sink portion 212b, light emission devices 281 mounted on the circuit board 282 spaced from one another, and a connector 283 provided to the circuit board 282 to connect the circuit board 282 to an external power source or a printed circuit board.

Though FIG. 9 illustrates a light emission device 281 of LED, the light emission device 281 is not limited to this, but can be a lamp like CCFL, or an organic luminescence device like OLED. The light emission device 281 can be configured to be so called "1-edge" type in which the light emission device 281 is disposed only an upper or lower side of the display panel 60 and the bottom cover 10.

A number of the light emission devices 281 can vary with a size of the display panel, i.e., inches of the display panel. The light emission device 281 can be disposed to be 2.5~3.5 times of the inches of the display panel.

Figure 10:
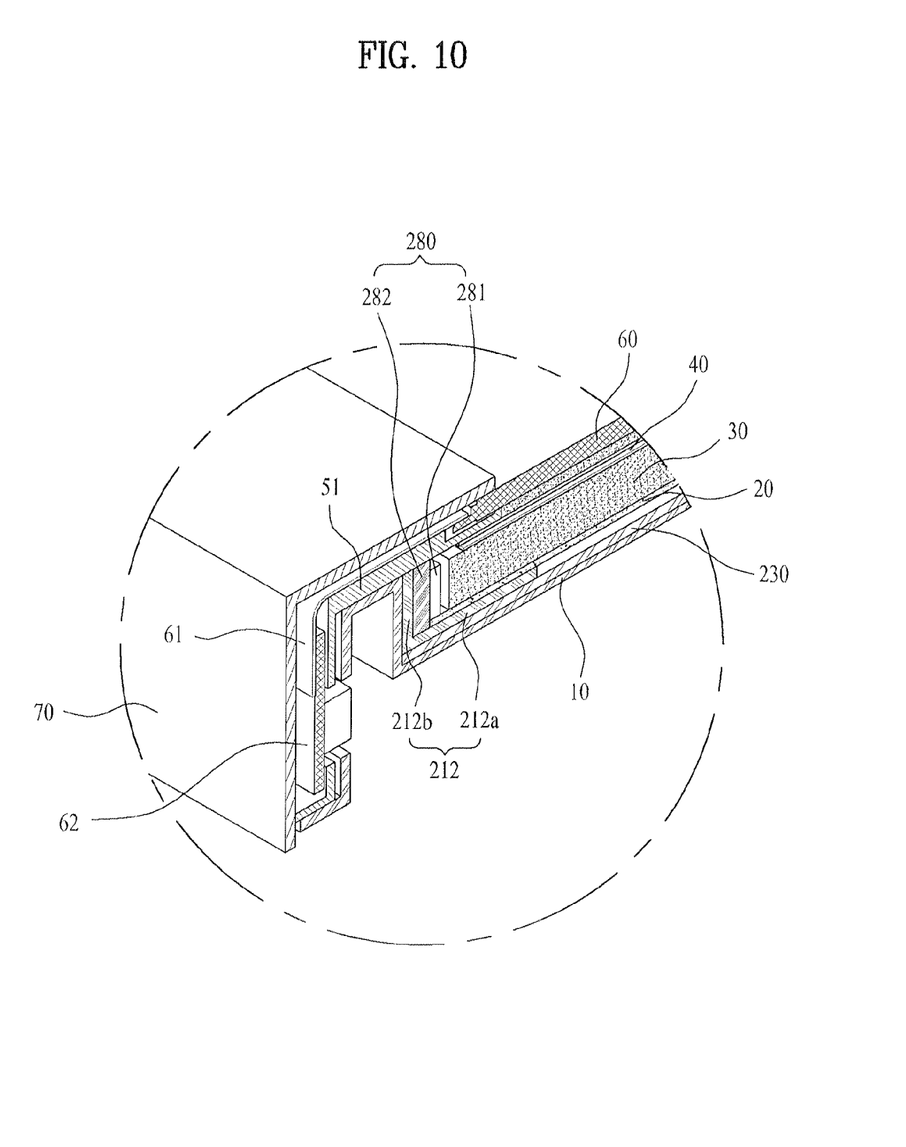
FIG. 10 illustrates a section of the display device in FIG. 1 across a line A-A'.

FIG. 10 illustrates a section of the display device in FIG. 1 across a line A-A'. As shown in FIG. 10, the second heat sink 212 has an "L" shape in which the first heat sink portion 212a is in contact with a lower side of the first heat sinks 230.

The second heat sink portion 212b is formed as one unit with the first heat sink portion 212a perpendicular or an angle close to perpendicular to the first heat sink portion 212a, and the light emission module 280 is disposed to the second heat sink portion 212b, wherein the circuit board 282 is mounted to the second heat sink portion 212b, and the light emission module 280 is disposed on the circuit board 282.

The circuit board 282 is coupled to the second heat sink 212 to be fastened thereto, in a coupling type as described with reference to FIGS. 2 to 8. The coupling enables to prevent the circuit board 282 from deforming (for an example, bending) by heat from the light emission device 281.

In a case power is applied to the circuit board 282 for the light emission device 281 to emit a light, the heat is generated consequently, transmitted to the first heat sinks 230 which is in contact with the second heat sink 212 via the second heat sink 212, and dissipated therefrom to an outside of the backlight unit.

There is a reflective sheet 20 disposed in front of the second heat sink 212 and the first heat sinks 230, and there is the light guide plate 30 disposed on a front of the reflective sheet 20. Since a side (a light incident surface) of the light guide plate 30 is disposed adjacent to the light emission device 281, the light enters into the light guide plate 30 from the light emission device 281.

Most of the light entered into the light guide plate 30 thus is directed forward while being reflected, totally reflected, and refracted within the light guide plate. However, the light travels backward is reflected at the reflective sheet 20 to return into the light guide plate 30, again.

Provided on a front of the light guide plate 30, there is an optical sheet 40 for causing an optical phenomenon of the light, and disposed in front of the optical sheet 40, there is a display panel 60. A flexible circuit board 61 is connected to the liquid crystal panel 60, extends to a lower side of the backlight unit through a first fastening member 51, and is connected to a printed circuit board 62 which is disposed on a lower portion of the bottom cover 10.

The upper cover 70 surrounds upper side, lower side, left side and right side edges of the liquid crystal panel 60 together with upper side, lower side, left side and right side edges of the backlight unit including the printed circuit board 62, the flexible printed circuit board 61, and the bottom cover 10, to couple the backlight unit and the liquid crystal panel 60, together.

In the embodiment configured thus, the first heat sink portion 212a can have at least one hole or recess formed therein, and the light emission module 280 can be disposed such that the light emission module 280 is inserted in and fastened to the at least one hole or recess formed in the first heat sink portion 212a in contact with the second heat sink portion 212b.

The recess or hole in the first heat sink portion 212a can be formed in an edge of the first heat sink portion 212a adjacent to the second heat sink portion 212b.

In this instance, the recess or hole in the first heat sink portion 212a can be single recess or a plurality of recesses disposed at regular intervals.

Or, the recess or hole in the first heat sink portion 212a can be a single line shaped hole or a plurality of holes disposed at regular intervals.

There can be at least one knoll 714 formed at an edge region of the first heat sink portion 212a adjacent to the second heat sink portion 212b spaced from the second heat sink portion 212b.

In this instance, the knoll 714 can be constructed of one of one line shaped body formed along and in parallel to a boundary surface between the first heat sink portion 212a and the second heat sink portion 212b, or can be constructed of plural formed along and in parallel to a boundary surface between the first heat sink portion 212a and the second heat sink portion 212b at regular intervals.

And, the second heat sink portion 212b can be connected to the edge region of the first heat sink portion 212a having the recess or hole formed therein and bent perpendicular to a surface of the first heat sink portion 212a.

And, the light emission module 280 can have at least one coupling projection 620 at one side thereof matched to the recess or hole in the first heat sink portion 212a such that the light emission module 280 can be placed in and coupled to the recess or hole in the first heat sink portion 212a.

The embodiment configured thus can prevent the substrate from bending by heat from the LED packages.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a bottom cover;
   a first heat sink portion disposed on the bottom cover;
   a second heat sink portion extended upward with respect to the first heat sink portion; and
   at least a portion of a light emission module placed in at least one hole of the first heat sink portion, and the light emission module disposed on the second heat sink portion,
   wherein the light emission module includes a circuit board and a light source unit disposed on a first surface of the circuit board,
   wherein a second surface of the circuit board contacts the second heat sink portion, and
   wherein a side surface of the circuit board penetrates the first heat sink portion, the side surface exposed out of the first heat sink portion.

2. The backlight unit as claimed in claim 1, wherein the hole in the first heat sink portion is formed in an edge of the first heat sink portion adjacent to the second heat sink portion.

3. The backlight unit as claimed in claim 1, wherein the hole in the first heat sink portion is a line shaped single hole.

4. The backlight unit as claimed in claim 1, wherein the hole in the first heat sink portion is a plurality of holes disposed at regular intervals.

5. The backlight unit as claimed in claim 1, further comprising a knoll formed at an edge region of the first heat sink portion adjacent to the second heat sink portion spaced from the second heat sink portion.

6. The backlight unit as claimed in claim 5, wherein the knoll is a line shaped single body formed along and parallel to a boundary surface between the first heat sink portion and the second heat sink portion.

7. The backlight unit as claimed in claim 5, wherein a plurality of knolls are formed along and parallel to the boundary surface between the first heat sink portion and the second heat sink portion.

8. The backlight unit as claimed in claim 1, wherein the second heat sink portion is connected to the edge region of the first heat sink portion having the hole formed therein and bent perpendicular to a surface of the first heat sink portion.

9. The backlight unit as claimed in claim 1, wherein the light emission module has at least one coupling projection formed at one side thereof matched to the hole in the first heat sink portion.

10. The backlight unit as claimed in claim 1, wherein the light emission module is fastened to the at least one hole.

11. A backlight unit comprising:
   a bottom cover;
   a light guide plate disposed on the bottom cover;
   a first heat sink portion on an inside of the bottom cover to be perpendicular to a light incident surface of the light guide plate and having at least one hole formed therein;
   a second heat sink portion perpendicular to and being one body with the first heat sink portion;
   a light emission module including at least a portion of a circuit board placed in the at least one hole in the first heat sink portion, and a light source unit disposed on a first surface of the circuit board; and
   an optical sheet disposed on the light guide plate, wherein a second surface of the circuit board contacts the second heat sink portion, and wherein a side surface of the circuit board penetrates a connection area disposed between the first heat sink portion and second heat sink portion, and the side surface of the circuit board is exposed out of the connection area.

12. The backlight unit as claimed in claim 11, wherein the circuit board has a long side placed in the at least one hole.

13. The backlight unit as claimed in claim 11, wherein one side of the first heat sink portion is opened at the at least one hole.

14. The backlight unit as claimed in claim 11, wherein the circuit board has a long side with at least one coupling projection for matching and coupling to the at least one hole.

15. The backlight unit as claimed in claim 11, wherein the first heat sink portion has a knoll on a region of the first heat sink portion spaced from the second heat sink portion in a shape of a horizontal line to the second heat sink portion.

16. The backlight unit as claimed in claim 11, wherein the first heat sink portion keeps in contact with the inside of the bottom cover.

17. A display device having a backlight unit, the display device comprising:

a bottom cover;

a light guide plate disposed on the bottom cover;

a first heat sink portion on an inside of the bottom cover to be perpendicular to a light incident surface of the light guide plate and having at least one hole formed therein;

a second heat sink portion perpendicular to and being one body with the first heat sink portion;

a light emission module including at least a portion of a circuit board placed in the at least one hole in the first heat sink portion, and a light source unit disposed on a first surface of the circuit board;

an optical sheet disposed on the light guide plate; and a display panel disposed on the optical sheet, wherein a second surface of the circuit board contacts the second heat sink portion, and wherein a side surface of the circuit board penetrates the first heat sink portion, the side surface exposed out of the first heat sink portion.

* * * * *